United States Patent
Kang et al.

(10) Patent No.: US 7,539,866 B2
(45) Date of Patent: May 26, 2009

(54) METHOD OF CRYPTOGRAPHING WIRELESS DATA AND APPARATUS USING THE METHOD

(75) Inventors: You-sung Kang, Daejeon (KR); Byung-ho Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 785 days.

(21) Appl. No.: 10/441,518

(22) Filed: May 20, 2003

(65) Prior Publication Data

US 2004/0073796 A1  Apr. 15, 2004

(30) Foreign Application Priority Data

Oct. 11, 2002  (KR)  ............... 10-2002-0062077

(51) Int. Cl.
*H04L 9/00*  (2006.01)
*H04K 1/00*  (2006.01)
(52) U.S. Cl. .................. 713/171; 380/273; 380/279
(58) Field of Classification Search ............. 713/171; 380/273, 279
See application file for complete search history.

(56) References Cited

U.S. PATENT DOCUMENTS

| | | | |
|---|---|---|---|
| 5,200,999 A * | 4/1993 | Matyas et al. | 380/277 |
| 6,393,127 B2 * | 5/2002 | Vogler | 380/283 |
| 6,526,506 B1 * | 2/2003 | Lewis | 713/153 |
| 6,851,050 B2 * | 2/2005 | Singhal et al. | 713/162 |
| 6,925,183 B2 * | 8/2005 | Jiang et al. | 380/278 |
| 6,931,132 B2 * | 8/2005 | Billhartz et al. | 380/280 |
| 7,028,186 B1 * | 4/2006 | Stenman et al. | 713/173 |
| 7,133,526 B2 * | 11/2006 | Whelan et al. | 380/270 |
| 7,221,764 B2 * | 5/2007 | Cohen et al. | 380/278 |
| 2002/0032855 A1 * | 3/2002 | Neves et al. | 713/154 |
| 2002/0076054 A1 * | 6/2002 | Fukutomi et al. | 380/277 |
| 2002/0094087 A1 | 7/2002 | Dellmo et al. | |
| 2003/0152235 A1 * | 8/2003 | Cohen et al. | 380/278 |
| 2003/0196115 A1 * | 10/2003 | Karp | 713/201 |
| 2003/0221098 A1 * | 11/2003 | Chen et al. | 713/153 |
| 2003/0226017 A1 * | 12/2003 | Palekar et al. | 713/168 |

(Continued)

FOREIGN PATENT DOCUMENTS

KR  1999-0042149  6/1999

(Continued)

OTHER PUBLICATIONS

Transactions in Java Card, 8 pages.

(Continued)

*Primary Examiner*—Emmanuel L Moise
*Assistant Examiner*—Techane J Gergiso
(74) *Attorney, Agent, or Firm*—Blakely, Sokoloff, Taylor & Zafman LLP (57) ABSTRACT

A key descriptor structure exchanged between a wireless LAN terminal and an access point, and a method and apparatus for cryptographing wireless data are provided. The key descriptor structure includes a key initial vector which is a random number generated in the access point, a key descriptor type which indicates an encryption algorithm, and a plurality of key materials encrypted according to the encryption algorithm of the key descriptor using the key initial vector and a master session key shared between the wireless LAN terminal and the access point as an encryption key.

11 Claims, 6 Drawing Sheets

U.S. PATENT DOCUMENTS

| | | | |
|---|---|---|---|
| 2004/0068653 A1* | 4/2004 | Fascenda | 713/168 |
| 2004/0073797 A1* | 4/2004 | Fascenda | 713/171 |
| 2004/0221155 A1* | 11/2004 | Venkatachary et al. | 713/153 |
| 2005/0081036 A1* | 4/2005 | Hsu | 713/171 |
| 2005/0254652 A1* | 11/2005 | Engler et al. | 380/270 |
| 2006/0161771 A1* | 7/2006 | Zhang | 713/168 |

FOREIGN PATENT DOCUMENTS

| | | |
|---|---|---|
| KR | 2001-008808 | 2/2001 |
| KR | 2001-0090037 | 10/2001 |

OTHER PUBLICATIONS

Method of executing a transaction on a smartcard, a smartcard and a transaction processing system including a smartcard, 3 pages.

An Initial Security Analysis of the IEEE 802.1X Standard, pp. 1-12.

TKIP Security Association, pp. 92-108.

Technology Trends on Authentication and Key Management in Public WLAN Networks, pp. 1-15.

IEEE, IETF, ETSI, 3GPP(3rd Generation Partnership Project), 12 pages.

* cited by examiner

METHOD OF CRYPTOGRAPHING WIRELESS DATA AND APPARATUS USING THE METHOD

BACKGROUND OF THE INVENTION

This application claims the priority of Korean Patent Application No. 2002-62077, filed on Oct. 11, 2002, in the Korean Intellectual Property Office, the disclosure of which is incorporated herein in its entirety by reference.

FIELD OF THE INVENTION

The present invention relates to an apparatus and method of cryptographing wireless data, and more particularly, to an apparatus and method of cryptographing wireless data exchanged between an access point and a wireless local area network (LAN) terminal constituting a wireless LAN system.

DESCRIPTION OF THE RELATED ART

In general, wireless LAN systems are well-known technologies that mean the structure of a network, in which a wireless LAN user installs a wireless LAN card in a laptop computer or other communication device, performs wireless communications with an access point and contacts a web server using a bridging function of the access point.

An access point used in the wireless LAN systems performs both a wireless section communications environment with a wireless LAN terminal and a wired section communications environment with existing Internet environments, and further performs a bridging function between wireless and wired communication systems. A conventional access point has no problems with data communications using a bridging function, whereas the conventional access point cannot support data security in a wireless section and wireless LAN terminal authentication. Authentication for a wireless LAN terminal to be used in the wireless LAN system and security of data in which the wireless LAN terminal communicates with the access point, are essential factors in constituting a wireless LAN security system.

As part of efforts to build wireless LAN security systems, a U.S. IEEE 802 committee has announced an IEEE 802.1X standard, and an IEEE 802.11i task group are having discussions about establishing standards for cryptography in a wireless section. An IEEE 802.1X standard defines a state machine about wireless LAN user authentication and exchange of an encryption key to be used in a wireless section (hereinafter, referred to as a wireless section encryption key), and an IEEE 802.11i standard has proceeded to standardization on a handshake method for an encryption key exchange and an encryption algorithm using an exchanged wireless section encryption key.

Hereinafter, wireless LAN user authentication, wireless section encryption key exchange, and a method of using an exchanged wireless section encryption key for building a conventional wireless LAN security system will be described with reference to the attached drawings.

Figure 1:
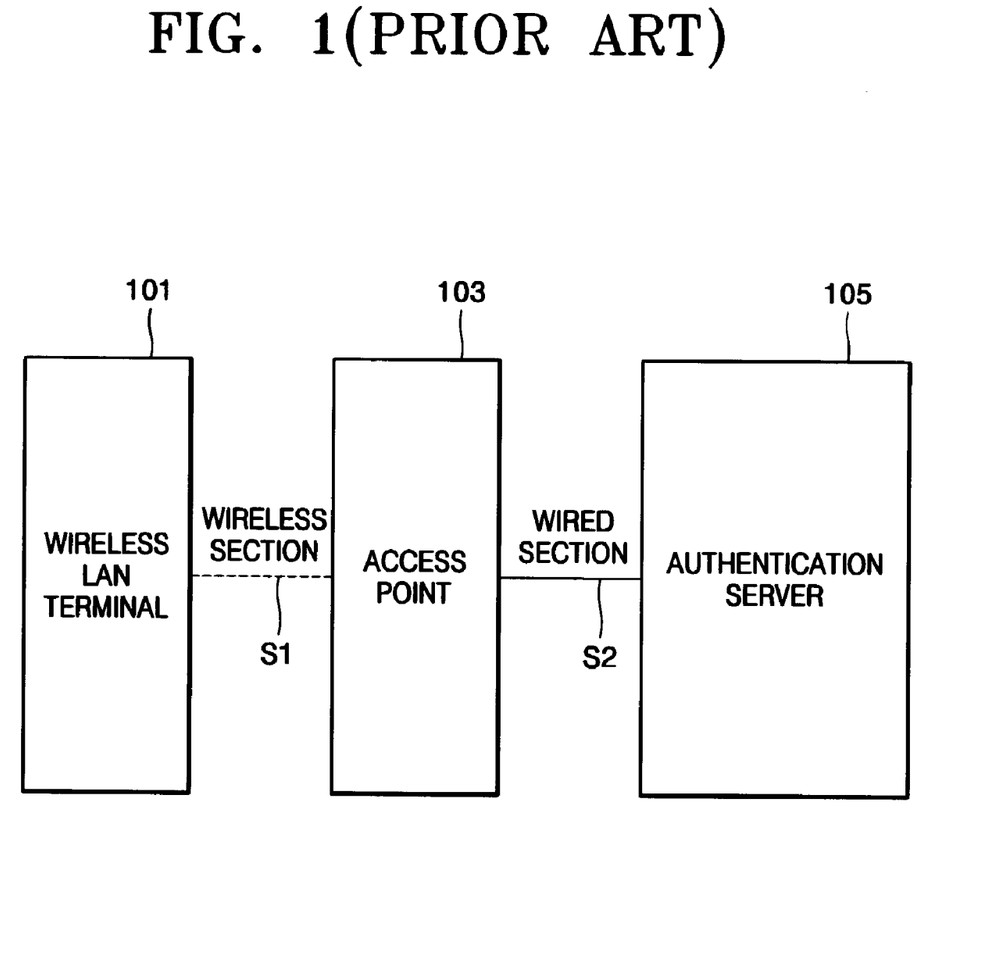
FIG. 1 shows the structure of a conventional wireless LAN user authentication system.

FIG. 1 shows the structure of a conventional wireless LAN user authentication system which comprises a wireless LAN terminal, an access point, and an authentication server. First, a right user should be authenticated by an authentication server 105 of a corresponding company so that a wireless LAN terminal 101 can use existing Internet services via an access point 103 of a specific company. When an authentication message is transmitted, wireless section S1 data are transmitted between the wireless LAN terminal 101 and the access point 103, and the access point 103 reconstructs an authentication message frame, which can be recognized by the authentication server 105, and transmits wired section S2 data to the authentication server 105.

In general, an authentication protocol performs both user authentication and key exchange. A transport layer security (TLS) protocol is a representative authentication protocol, and an extensible authentication protocol (EAP) protocol, which can be extended into a variety of authentication protocols, is used in a wireless LAN system. As one of extensible protocols, an EAP-TLS protocol can be used in the wireless LAN system. If user authentication succeeds using the EAP-TLS protocol, the authentication server 105 authenticates the wireless LAN terminal 101, and the authentication server 105 and the wireless LAN terminal 101 share the same key (hereinafter, is referred to as "masker session key"). The authentication server 105 transfers the above master session key to the access point 103, and the access point 103 exchanges a wireless section encryption key to be used in an actual wireless section, with the wireless LAN terminal 101, using the master session key.

Figure 2:
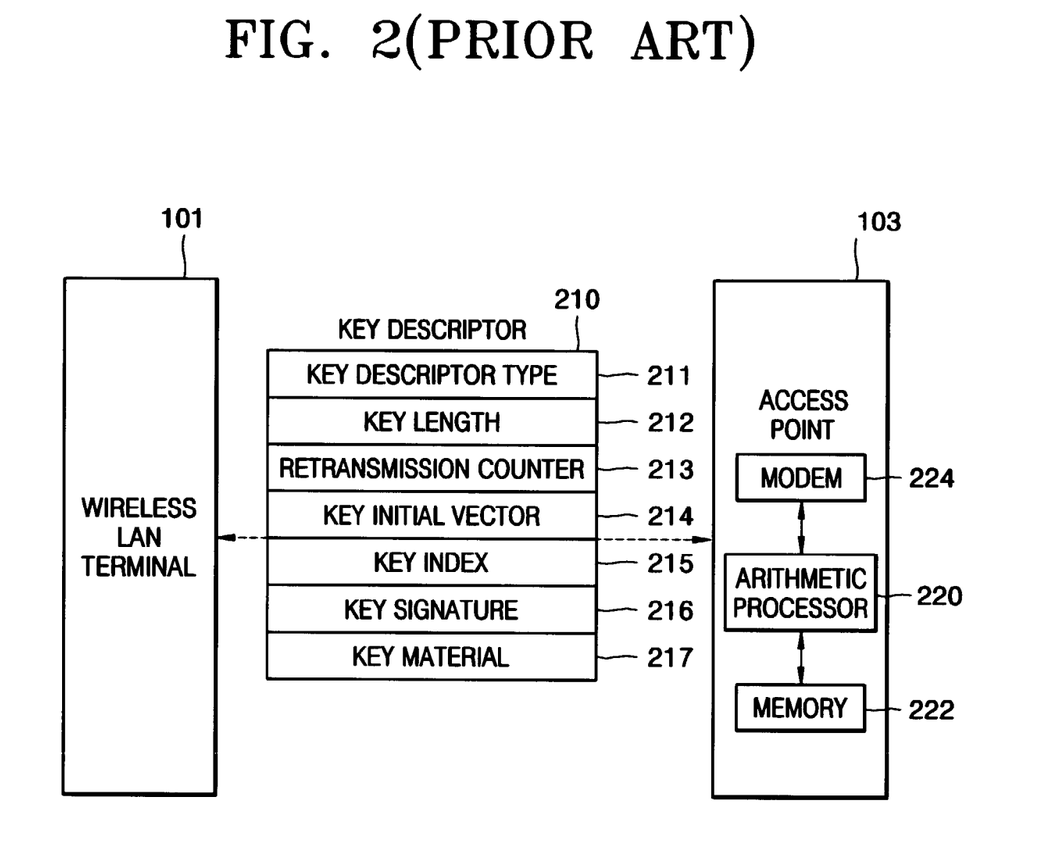
FIG. 2 shows the structure of a key exchange system that exchanges a conventional key descriptor between a wireless LAN terminal and a conventional access point.

FIG. 2 shows the structure of a key exchange system that exchanges a conventional key descriptor 210 between a wireless LAN terminal 101 and a conventional access point 103. The conventional access point 103 includes an arithmetic processor 220, a memory 222, and a communication modem 224, which are conventional elements. As a well-known structure, the conventional key descriptor 210 includes a key descriptor type 211 which indicates an encryption algorithm for encrypting a key material 217, a key length 212, a retransmission counter 213, usually a network time protocol (NTP) time, which is a serial number for preventing endless retransmission, a key initial vector 214 which is a random number combined with a master session key for encryption of a key material, a key index 215 which is a serial number of a key descriptor, a key signature 216 which guarantees the integrity of the key descriptor, and a key material 217 which is to be exchanged with the wireless LAN terminal 101. Here, the conventional key descriptor 210 defines that one wireless section encryption key is used for the key 217.

Among the fields of the conventional key descriptor 210, the key initial vector 214, the key signature 216, and the key 217 should be generated from random number and processed by encryption algorithm. The conventional access point 103 performs such security processing through the conventional arithmetic processor 220. As such, when a plurality of wireless LAN terminals connect to the conventional access point and request an authentication and encryption algorithm process, a serious bottleneck may occur.

The wireless LAN user authentication in the wireless LAN security system, the master session key exchange between the wireless LAN terminal 101 and the authentication server 105, the structure of the conventional key descriptor 210 for the wireless section encryption key exchange between the wireless LAN terminal 101 and the access point 103, and the typical operation of the access point 103 have been described above.

However, the conventional key descriptor 210 defines only one key material to be used as the wireless section encryption key. Thus, in order to perform wireless section encryption re-keying or use different wireless section encryption keys, an additional process for transmission of the key descriptor is needed, which increases network traffic and the total processing time. In addition, as previously described, the conventional access point 103 causes a bottleneck in security processing for generation and transmission of the key descriptor, and thus network traffic and the total processing time are increased in a wireless section.

SUMMARY OF THE INVENTION

The present invention provides a key descriptor data structure, which prevents a bottleneck in security processing for generation and transmission of a key descriptor between a wireless local area network (LAN) terminal and an access point.

The present invention further provides an access point, which guarantees stable communications and secure cryptography data transmission between the wireless LAN terminal and the access point using the key descriptor data structure, and a method and apparatus for cryptographing wireless data between the access point and the wireless LAN terminal using the key descriptor data structure.

According to an aspect of the present invention, there is provided a key descriptor structure exchanged between a wireless LAN terminal and an access point. The structure includes a key initial vector which is a random number generated in the access point, a key descriptor type which indicates an encryption algorithm, and a plurality of key materials encrypted according to the encryption algorithm of the key descriptor using the key initial vector and a master session key shared between the wireless LAN terminal and the access point as an encryption key.

According to another aspect of the present invention, there is provided an access point, which constitutes at least one wireless LAN terminal, an authentication server, and a network. The access point includes an arithmetic processor which processes data communicated with the network and performs the control of the access point, a master session key receiver which receives a master session key from the authentication server and stores the master session key, a security processor which encrypts a key material according to an encryption algorithm indicated by a key descriptor type using the master session key and a key initial vector as an encryption key, a transmitter which outputs a key descriptor including the encrypted key material, and an interface which transmits and receives the key descriptor output by the transmitter and data to and from the wireless LAN terminal.

According to another aspect of the present invention, there is provided a method of exchanging a wireless section encryption key using a key descriptor between a wireless LAN terminal and an access point. The method comprises (a) receiving a master session key from an authentication server through the access point and sharing the wireless LAN terminal and the master session key, (b) generating a plurality of key materials in the access point, (c) transmitting the key descriptor including the key materials encrypted on the basis of the master session key and the key initial vector, to the wireless LAN terminal, and (d) detecting a wireless section encryption key from the key descriptor received by the wireless LAN terminal.

According to another aspect of the present invention, there is provided a method of exchanging wireless data between a wireless LAN terminal and an access point. The method comprises (a) generating a plurality of key materials in the access point, (b) transmitting a key descriptor including the key materials to the wireless LAN terminal and detecting a wireless section encryption key from the key descriptor received by the wireless LAN terminal, (c) encrypting data according to an algorithm designated in a tag field through the access point and transmitting encrypted data with the tag, and (d) receiving the encrypted data through the wireless LAN terminal and decrypting the data on the basis of the algorithm and the wireless section encryption key.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described with reference to the attached drawings.

In the present invention, a key descriptor is exchanged prior to cryptographing wireless data. Thus, the structure of the key descriptor and the method of exchanging a key descriptor will be described as a step of the method of cryptographing wireless data.

Figure 3:
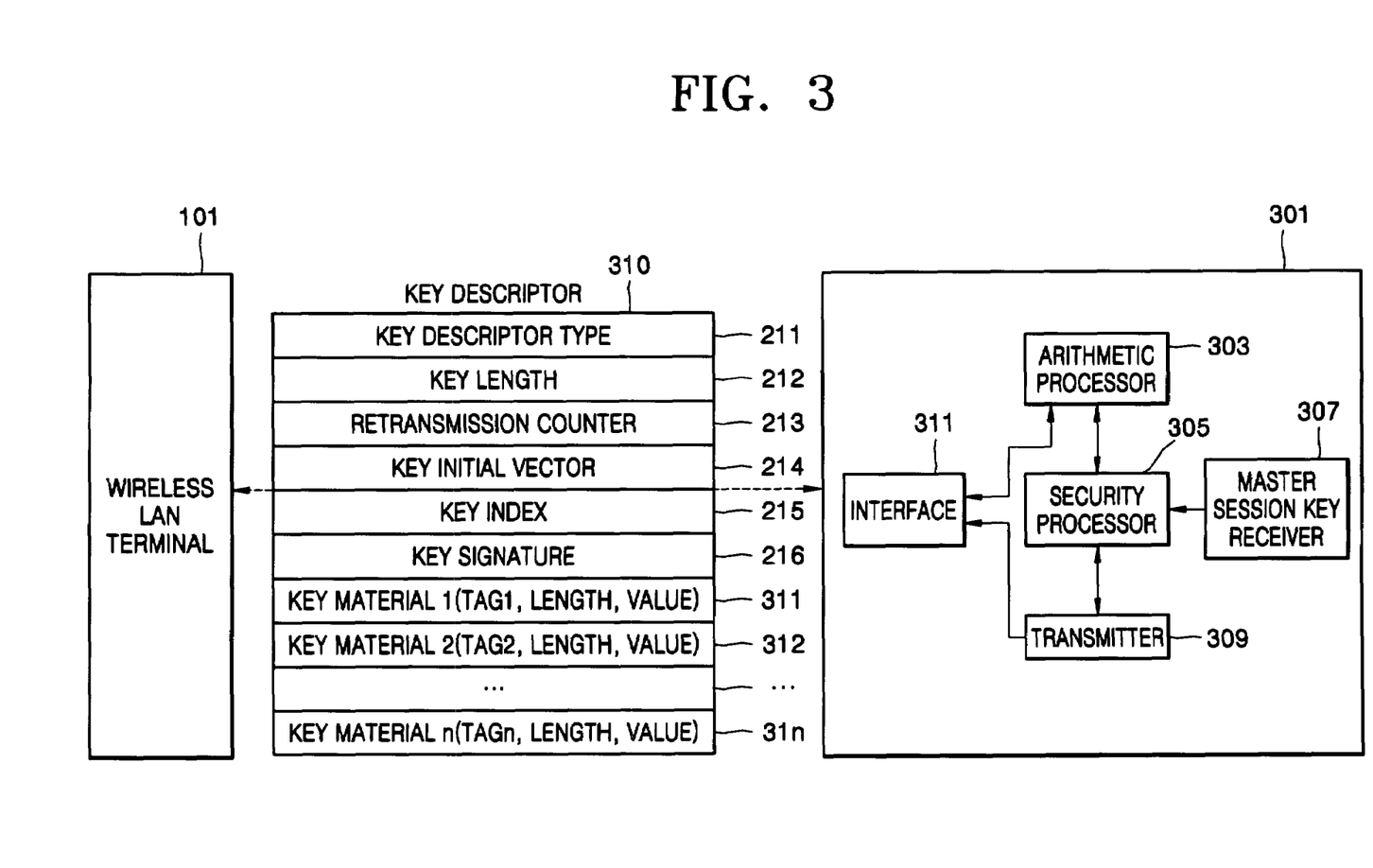
FIG. 3 shows a key descriptor, and a wireless LAN terminal and an access point that exchange the key descriptor according to the present invention.
Figure 4:
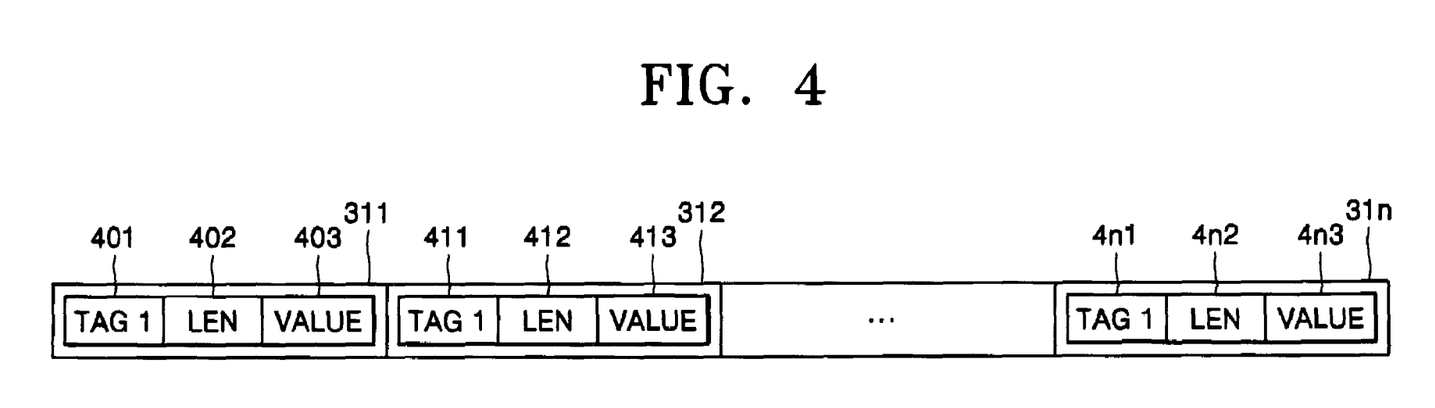
FIG. 4 shows the structure of a data frame that transmits n wireless section encryption key materials, part of the key descriptor according to the present invention.
Figure 6:
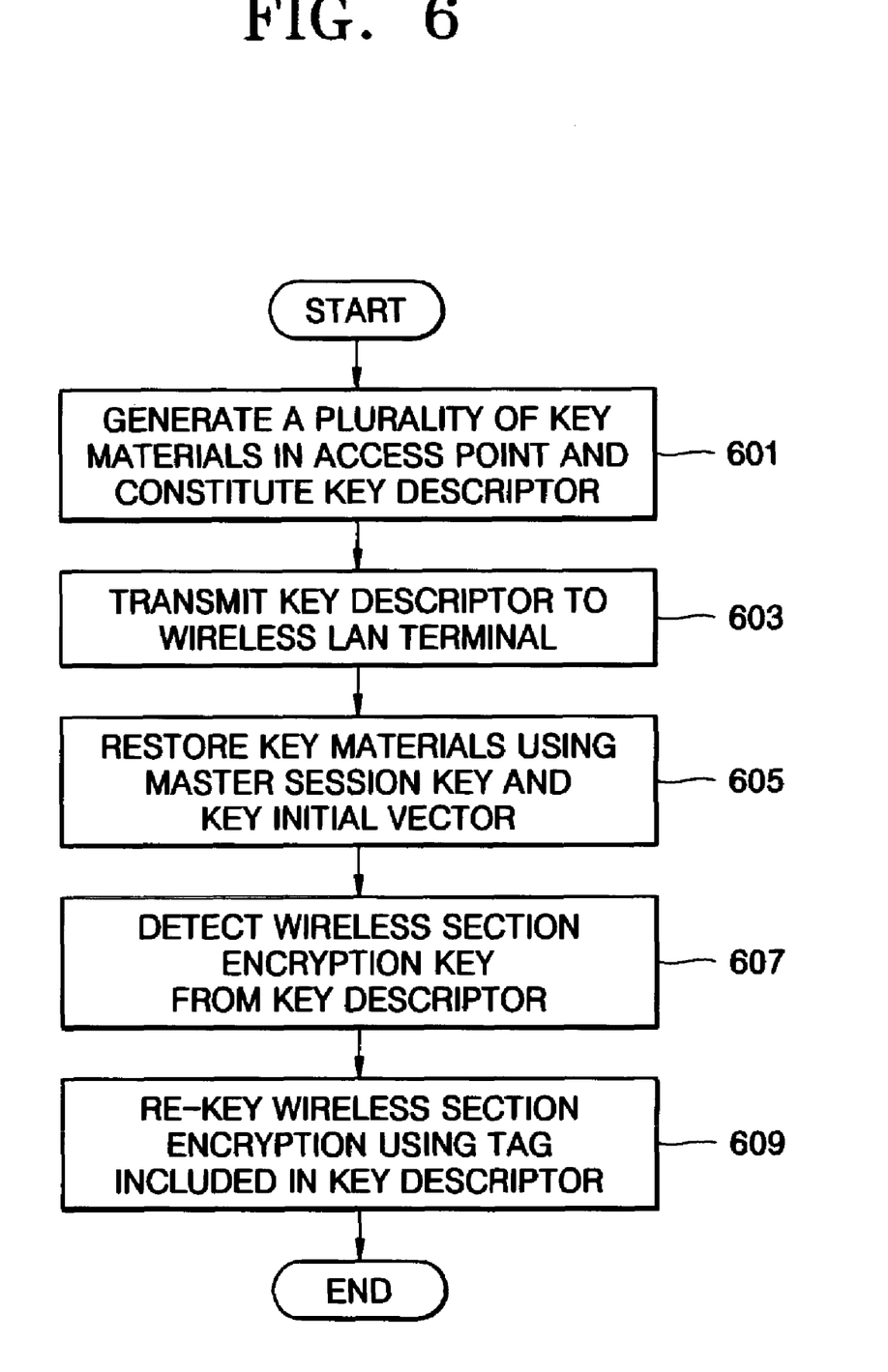
FIG. 6 shows a flowchart illustrating a method of exchanging a wireless section encryption key using the key descriptor according to the present invention.
Figure 7:
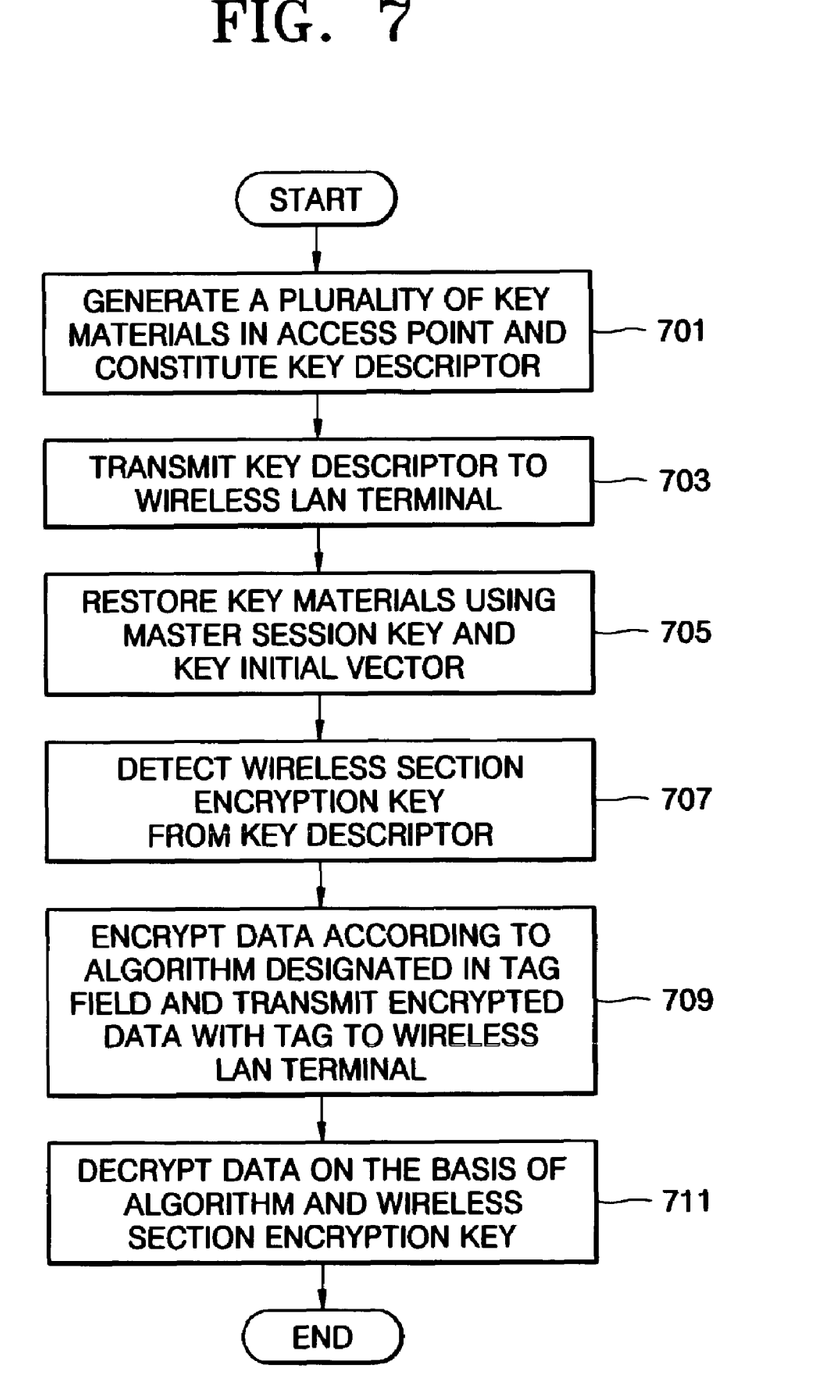
FIG. 7 shows a flowchart illustrating a method of cryptographing wireless data based on a wireless section encryption key using the key descriptor according to the present invention.

FIG. 3 shows a key descriptor, and a wireless LAN terminal and an access point that exchange the key descriptor according to the present invention, and FIG. 4 shows the structure of a data frame in which n wireless section encryption key materials are transmitted. The data frame illustrated in FIG. 4 is part of the key descriptor according to the present invention. Meanwhile, FIG. 6 shows a flowchart illustrating a method of exchanging a wireless section encryption key using the key descriptor according to the present invention, and FIG. 7 shows a flowchart illustrating a method of cryptographing wireless data based on a wireless section encryption key using the key descriptor according to the present invention.

Referring to FIG. 3, the access point 301 according to the present invention includes an arithmetic processor 303, a master section key receiver 307, a security processor 305, a transmitter 309, and an interface 311. The arithmetic processor 303 includes a CPU, a ROM, a RAM, and a modem, like a conventional arithmetic processor. This has been previously described in FIG. 2, and thus the descriptions thereof will be omitted. The master session key receiver 307 receives a master session key from an authentication server, stores the received master session key, and outputs the master session key when a key material, which will be described later, is formed. The security processor 305 encrypts a key material according to an encryption algorithm indicated by a key descriptor type using the master session key and a key initial vector as an encryption key. The transmitter 309 outputs a key descriptor including the encrypted key material. The interface 311 transmits and receives the key descriptor output by the transmitter 309 and data to and from the wireless LAN terminal. Here, the security processor 305 may include a detailed functional block such as a tag generator, an encryption key length generator, and a key value generator. The tag generator generates a tag for designating an encryption algorithm used in a wireless section. The encryption key length generator designates the length of a wireless section encryption key. And the key value generator generates a wireless section encryption key value. On the whole, if the access point 301 safely receives a master session key from an authentication server 105, the security processor 305 generates a random number for use in a key initial vector 214 of the field of a key descriptor 310, performs a hash function for key signature 216, implements a signature algorithm, generates a random number for generating wireless section encryption key materials 311, 312, ..., and 31n, or implements a key value generation algorithm, thereby constituting the key descriptor 310 (steps 601 and 701). Here, the wireless section encryption key materials 311, 312, ..., and 31n are encrypted according to the encryption algorithm defined by a key descriptor type 211 using the master session key and the key initial vector 214 as an encryption key. The transmitter 309 of the access point 301 transmits the key descriptor 310 to the wireless LAN terminal 101 via the interface 311 (steps 603 and 703).

The wireless LAN terminal 101 which receives the key descriptor 310 from the access point 301, analyzes the key descriptor 310 and restores the wireless section encryption key materials 311, 312, ..., and 31n using its own master session key and the received key initial vector 214 as an encryption key (steps 605 and 705). The key signature 216 is used to guarantee the integrity of the key descriptor 310 received by the wireless LAN terminal 101. When the wireless LAN terminal 101 succeeds in restoring the wireless section encryption key materials 311, 312, ..., and 31n, the wireless LAN terminal 101 transmits a response for indicating normal success to the access point 301. On the other hand, when the wireless LAN terminal 101 fails to restore the wireless section encryption key materials 311, 312, ..., and 31n, the wireless LAN terminal 101 waits for retransmission of the key descriptor 310 (steps 607 and 707). In the above structure, the wireless LAN terminal 101 does not perform an operation for generating and transmitting the key descriptor 310. As a result, since the access point 301 does not need to perform a process for receiving and analyzing the key descriptor 310, the access point 301 according to the present invention implements key descriptor generation and transmission.

Unlike a conventional method of exchanging only one wireless section encryption key, as the result of exchanging the key descriptor 310 according to the present invention, a plurality of wireless section encryption keys are exchanged between the wireless LAN terminal 101 and the access point 301. Thus, wireless section encryption re-keying can be implemented using another one among wireless section encryption keys that have been already exchanged, without performing an additional process for exchanging a key descriptor. Also, as the result of exchanging the key descriptor 310 according to the present invention, data security can be improved using different encryption algorithms or different wireless section encryption keys for each transmission frame.

Next, a process for exchanging wireless data will be described with reference to FIGS. 4 and 5.

FIG. 4 shows the structure of a data frame in which n wireless section encryption key materials are transmitted. The data frame illustrated in FIG. 4 is part of the key descriptor according to the present invention. And FIG. 5 shows a wireless section encryption algorithm indicated by a tag field and the structure of a data frame encrypted using a corresponding wireless section encryption key.

Each of n wireless section encryption key materials 311, 312, ..., and 31n transmitted as part of the key descriptor 310 according to the present invention includes a tag, a length, and a value. Tags 401, 411, ..., and 41n indicate a wireless section encryption algorithm, and lengths 402, 412, ..., and 4n2 represent the lengths of wireless section encryption keys, and values 403, 413, ..., and 4n3 are wireless section encryption keys.

For example, it is assumed that a tag 1 is a wired equivalent privacy (WEP) algorithm, tag 2 is a temporary key integrity protocol (TKIP) algorithm, tag 3 is an AES-CCM mode, tag 4 is an AES-OCB mode, tag 5 is a SEED algorithm, and tag 6 is a RSA algorithm. The WEP and the TKIP are wireless LAN encryption algorithms. The AES-CCM and the AES-OCB are symmetrical key algorithms that can be used in the wireless LAN security system. RSA is a typical public key algorithm.

Data needed in encryption in a wireless section S1, precede the tag 401 field, and data encrypted using a corresponding wireless section encryption key 403 are transmitted after the tag 401 field. In the above example, data that precede tag 1 and are encrypted according to the WEP algorithm are transmitted after the tag 1 field. Even though wireless section encryption re-keying is needed between the access point 301 and the wireless LAN terminal 101, since one is selected from among a plurality of wireless section encryption keys that have already been exchanged, is set to the value of a tag field, and an encryption algorithm and a wireless section encryption key, which correspond to the tag, wireless section encryption re-keying can be implemented without exchanging an additional key descriptor 310. In addition, in the above tag field-preceding structure, a wireless section encryption algorithm of encrypted data can be noted from the tag field, and thus a former process in which the access point 301 and the wireless LAN terminal 101 negotiate a wireless section encryption algorithm in advance, may be omitted (step 609).

Figure 5:
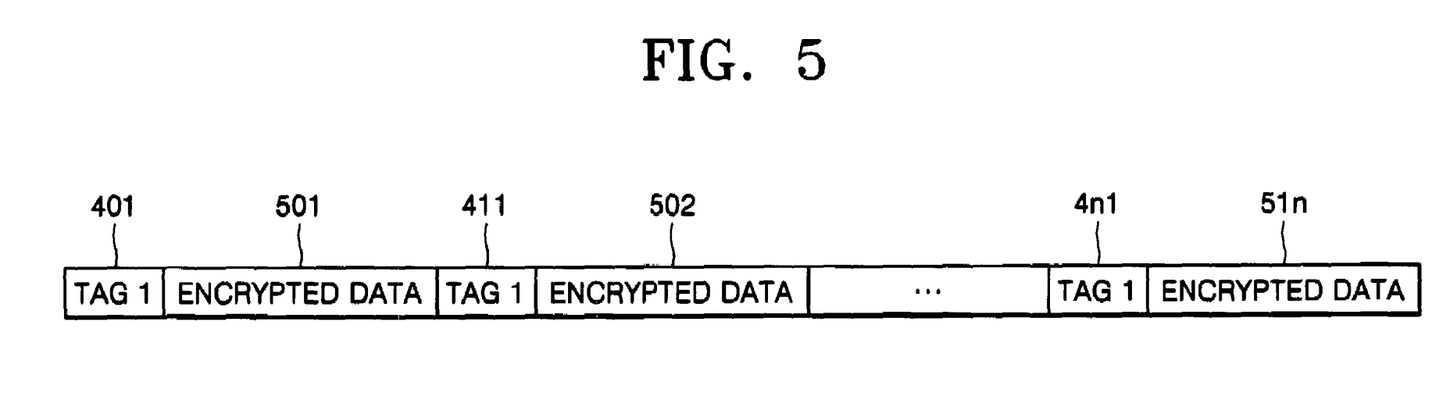
FIG. 5 shows a wireless section encryption algorithm indicated by a tag field and the structure of a data frame encrypted using a corresponding wireless section encryption key.

If different encryption algorithms are applied to each transmission frame so as to improve wireless section data security, data that precede the tag field and are differently encrypted for each transmission frame can be generated using a corresponding encryption algorithm and a corresponding wireless section encryption key, as shown in FIG. 5. Also, values of tag fields are not set to serial values but the order of tag fields is randomly selected. Thus, the encryption algorithm cannot be revealed.

The above tag field-preceding structure requires measures for protecting tag fields. Accordingly, a method of protecting tag fields using a master session key is applied to the present invention. In the method of protecting tag fields, the tag fields are protected using the master session key as an encryption key and using a symmetrical key encryption algorithm between the access point 301 and the wireless LAN terminal 101. An encryption algorithm, which is set by the access point 301 and the wireless LAN terminal 101 in advance or which corresponds to the value of a tag that has been defined in advance among wireless section encryption algorithms exchanged through the key descriptor, may be used as the symmetrical key encryption algorithm used in the method of protecting tag fields (step 709).

The encrypted data are restored to their original state on the basis of the encryption algorithm and the wireless section encryption key (step 711).

Consequently, in the access point 301 according to the present invention, the security processor 305 performs random number generation for generation and transmission of the key descriptor 310, hash function processing, and encryption algorithm operation and further performs an encryption algorithm operation for decrypting the encrypted tag fields and the encrypted data fields in the structure of data transmission of FIG. 5, thereby preventing a bottleneck caused by delay in a security processing time occurring in the conventional access point 103.

The method of cryptographing wireless data between the wireless LAN terminal and the access point according to the present invention can be implemented with computer readable codes of computer readable recording media. The computer readable recording media include all kinds of recording apparatuses in which computer readable data are stored. The computer readable recording media include ROMs, RAMs, CD-ROMs, magnetic tapes, floppy discs, and optical data storage apparatuses, but excludes carrier waves (i.e., transmission via Internet). The computer readable recording media are dispersed to a computer system that is connected to a network, and thus computer readable codes can be stored and executed by a dispersion method. In addition, the font ROM data structure according to the present invention can be implemented with computer readable codes of computer readable recording media such as ROMs, RAMs, CD-ROMs, magnetic tapes, floppy discs, and optical data storage apparatuses.

As described above, in the access point according to the present invention, the security processor performs random number generation for generation and transmission of the key descriptor, hash function processing, and encryption algorithm operation and further performs an encryption operation using the wireless section encryption key exchanged with the wireless LAN terminal through the key descriptor. Thus, even though the plurality of wireless LAN terminals transmit data requiring an encryption operation, a remarkable decrease in data transmission speed occurring in the conventional access point can be prevented.

In addition, unlike the conventional method of exchanging only one wireless section encryption key, in the key exchange method according to the present invention, as the result of exchanging the key descriptor, n wireless section encryption keys are exchanged between the wireless LAN terminal and the access point. Thus, wireless section encryption re-keying can be implemented using another one among wireless section encryption keys that have already been exchanged, without performing an addition process for exchanging the key descriptor for wireless section encryption re-keying, thereby rapidly implementing re-keying. Further, the encryption operation for each transmission frame can be performed using different wireless section encryption keys, thereby improving wireless section data security.

In particular, in the access point and the method of exchanging a plurality of wireless section encryption keys using the access point according to the present invention, strong confidentiality of wireless LAN system security is achieved, and rapid encryption operation is performed such that technology developments for increasing a physical layer transmission speed of the wireless LAN system are achieved and ultrahigh-speed wireless Internet using the wireless LAN system is widely used.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A system comprising:
a wireless LAN terminal coupled to an access point device, the wireless LAN terminal and access point device operate to exchange a key descriptor, the key descriptor having a structure comprising:
a key initial vector which is a random number generated in the access point device;
a key descriptor type which indicates an encryption algorithm; and
a plurality of key materials encrypted according to the encryption algorithm of the key descriptor using the key initial vector and a master session key shared between the wireless LAN terminal and the access point device, a first encrypted key material to enable formation of a first encryption key,
wherein a second wireless session encryption key that is formed by the wireless LAN terminal from a second encrypted material of the plurality of encrypted key materials after the first encrypted key material operates as a new encryption key that is different from the first encryption key for re-keying wireless LAN terminal encryption, and
wherein each of the key materials comprises:
a tag part which designates a wireless section encryption algorithm;
a length part which designates the length of a wireless section encryption key; and
a key value part which represents the wireless section encryption key.

2. A method of exchanging a wireless section encryption key using a key descriptor between a wireless LAN terminal and an access point, the method comprising:
(a) receiving a master session key from an authentication server through the access point and sharing the wireless LAN terminal and the master session key;
(b) generating a plurality of encrypted key materials in the access point, wherein (b) further comprises:
(b1) generating a tag which designates a wireless section encryption algorithm;
(b2) calculating the length of a wireless section encryption key of the encryption algorithm indicated by the tag; and
(b3) generating an actual value of the encryption key;
(c) transmitting the key descriptor including the plurality of encrypted key materials on the basis of the master session key and the key initial vector, to the wireless LAN terminal;
(d) detecting a first wireless section encryption key from a first encrypted key material of the key descriptor received by the wireless LAN terminal based on a type of algorithm used in encrypting the plurality of encrypted key materials; and
re-keying wireless section encryption with a second wireless session encryption key that is formed by the wireless LAN terminal from a second encrypted material of the plurality of encrypted key materials that is after the first encrypted key material.

3. The method of claim 2, wherein (b1) further comprises arranging the tag randomly.

4. A computer readable recording medium on which a program for executing the method of claim 2 in a computer is recorded.

5. A method of exchanging wireless data between a wireless LAN terminal and an access point, the method comprising:
   (a) generating a plurality of encrypted key materials in the access point, wherein (a) further comprises:
      (a1) generating a tag which designates a wireless section encryption algorithm;
      (a2) calculating the length of a wireless section encryption key of the encryption algorithm indicated by the tag; and
      (a3) generating an actual value of the encryption key;
   (b) transmitting a key descriptor including the plurality of encrypted key materials to the wireless LAN terminal and detecting a first wireless section encryption key from a first encrypted key material of the key descriptor received by the wireless LAN terminal based on the type of algorithm used to encrypt the plurality of encrypted key materials;
   (c) encrypting data according to the algorithm designated in a tag field through the access point and transmitting encrypted data with the tag; and
   (d) receiving the encrypted data through the wireless LAN terminal and decrypting the data on the basis of the algorithm and the first wireless section encryption key,
   wherein a second wireless session encryption key that is formed by the wireless LAN terminal from a second encrypted material of the plurality of encrypted key materials after the first encrypted key material operates as a new wireless section encryption key that is different from the first encryption key for re-keying wireless LAN terminal encryption.

6. The method of claim 5, wherein (c) comprises (c1) designating different algorithms for each tag field and encrypting the tag field according to the different algorithms.

7. The method of claim 6, wherein (c1) further comprises arranging the tag randomly.

8. The method of claim 5, wherein in (c), the tag field is encrypted using the master session key as an encryption key and using a symmetrical key algorithm between the wireless LAN terminal and the access point.

9. A computer readable recording medium on which a program for executing the method of claim 5 in a computer is recorded.

10. An access point, which constitutes at least one wireless LAN terminal, an authentication server, and a network, the access point comprising:
   an arithmetic processor which processes data communicated with the network and performs the control of the access point;
   a master session key receiver which receives a master session key from the authentication server and stores the master session key;
   a security processor which encrypts a key material according to an encryption algorithm indicated by a key descriptor type using the master session key and a key initial vector as an encryption key;
   a transmitter which outputs a key descriptor including the encrypted key material; and
   an interface which transmits and receives the key descriptor output by the transmitter and data to and from the wireless LAN terminal,
   wherein the LAN terminal detects a first wireless section encryption key from a first encrypted key material of the key descriptor received by the wireless LAN terminal based on the indicated key descriptor type, and wherein the wireless LAN terminal forms a second encrypted key material from the plurality of other encrypted key materials after the first encrypted key material to operate as a new wireless LAN terminal encryption key that is different from the first encryption key for re-keying wireless LAN terminal encryption; and
   wherein the security processor comprises:
   a tag generator which generates a tag for designating an encryption algorithm to be used in a wireless section;
   an encryption key length generator which designates the length of a wireless section encryption key; and
   a key value generator which generates a wireless section encryption key value.

11. The access point of claim 10, wherein the security processor further includes a multiple cryptography unit, which designates different tag values for each data frame that is transmitted and received between the wireless LAN terminal and the access point, encrypts the data of each data frame according to a different encryption algorithm and outputs the data.

* * * * *